(12) United States Patent
Kitamura (10) Patent No.: US 9,026,611 B2
(45) Date of Patent: May 5, 2015

(54) DNS NAME RESOLUTION SYSTEM, OVERRIDE AGENT, AND DNS NAME RESOLUTION METHOD

(75) Inventor: Hiroshi Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 633 days.

(21) Appl. No.: 13/260,466

(22) PCT Filed: Mar. 24, 2010

(86) PCT No.: PCT/JP2010/055069
§ 371 (c)(1),
(2), (4) Date: Sep. 26, 2011

(87) PCT Pub. No.: WO2010/110308
PCT Pub. Date: Sep. 30, 2011

(65) Prior Publication Data
US 2012/0030334 A1    Feb. 2, 2012

(30) Foreign Application Priority Data
Mar. 26, 2009    (JP) .................................. 2009-076139

(51) Int. Cl.
*G06F 15/16*    (2006.01)
*H04L 29/12*    (2006.01)
(Continued)

(52) U.S. Cl.
CPC .... *H04L 29/12066* (2013.01); *H04L 29/08072* (2013.01); *H04L 29/06* (2013.01); *H04L 61/1511* (2013.01)

(58) Field of Classification Search
CPC .......................... H04L 29/08072; H04L 29/06
USPC .................. 709/203, 206, 220, 226, 246
See application file for complete search history.

(56) References Cited

U.S. PATENT DOCUMENTS 6,976,090 B2 * 12/2005 Ben-Shaul et al. ............ 709/246
7,441,045 B2 * 10/2008 Skene et al. ................... 709/241
(Continued)

FOREIGN PATENT DOCUMENTS

JP     11-340984      12/1999
JP     11-340984 A    12/1999
(Continued)

OTHER PUBLICATIONS

Shima, Shigeyoshi et al., "A Secure IPv6 Global Communication Architecture Based on SSA (Service Specific Address) Information Propagation Mechanism: DNSO (DNS Name Space Override)", IEICE Technical Report, vol. 108, No. 136, pp. 17-22.
RFC1035 "Domain Names—Implementation and Specification", Nov. 1987, [search made on Feb. 19, 2009], Web URL: http://www.ietf.org/rfc/rfc1035.txt.
(Continued)

*Primary Examiner* — Khanh Dinh
(74) *Attorney, Agent, or Firm* — Scully, Scott, Murphy & Presser, P.C.

(57) ABSTRACT

A DNS name resolution system according to the present invention has a DNS server; a terminal which generates and transmits a DNS query packet containing DNS name information described in accordance with a specific description method and whose destination is said DNS server; and an override agent which is disposed along a communication path between the terminal and the DNS server. The override agent has a capture unit which captures a DNS query packet transmitted from the terminal; an analysis unit which stores in advance information concerning the specific description method based on which the DNS name information was described by the terminal, analyzes the DNS name information contained in the DNS query packet captured by the capture unit based on the specific description method, and selects the information for reply to the terminal based on the analysis results; and a reply unit which generates and transmits a DNS response packet containing the information for reply selected by the analysis unit and whose destination is the terminal.

11 Claims, 4 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 7,734,745 B2* | 6/2010 | Gloe | 709/223 |
| 8,224,994 B1* | 7/2012 | Schneider | 709/245 |
| 8,406,170 B2* | 3/2013 | Rune | 370/328 |
| 2001/0052016 A1* | 12/2001 | Skene et al. | 709/226 |
| 2013/0311608 A1* | 11/2013 | Degaonkar et al. | 709/217 |

FOREIGN PATENT DOCUMENTS

| | | |
|---|---|---|
| JP | 2000-137666 | 5/2000 |
| JP | 2000-137666 A | 5/2000 |
| JP | 2000-253067 | 9/2000 |
| JP | 2000-253067 A | 9/2000 |

OTHER PUBLICATIONS

RFC1034 "Domain Names—Concepts and Facilities", Nov. 1987, [search made on Feb. 19, 2009], Web URL: http://www.ietf.org/rfc/rfc1034.txt.

RFC1738 "Uniform Resource Locators (URL)", Dec. 1994, [search made on Feb. 19, 2009], Web URL: http://www.ietf.org/rfc/rfc1738.txt.

International Search Report dated Jun. 29, 2010 issued in related PCT/JP2010/055069.

Shima et al. "A Secure IPv6 Global Communication Architecture Based on SSA (Service Specific Address) Information Propagation Mechanism: DNSO (DNS Name Space Override)" Institute of Electronics, Information and Communication Engineers Technical Research Report vol. 108, pp. 17-22 No. 136 Jul. 2008 Japan Engl. language Abstract.

Japanese Office Action dated Dec. 3, 2013 received from the Japanese Patent Office in a related case.

\* cited by examiner

EXAMPLE 1) ON CLIENT NODE

EXAMPLE 2) ON NODE DISPOSED ALONG A COMMUNICATION PATH

EXAMPLE 3) ON DNS SERVER

EXAMPLE 1)

```
xa---sel?key1=val1&key2=val2----server.example.com
```
INDICATES ENCODE TYPE | BODY OF ADDITIONAL INFORMATION | INDICATES END OF ADDITIONAL INFORMATION

EXAMPLE 2)

```
ya---sel(val1,val2)---server.example.com
```
INDICATES ENCODE TYPE | BODY OF ADDITIONAL INFORMATION | INDICATES END OF ADDITIONAL INFORMATION

FIG. 5

DNS NAME RESOLUTION SYSTEM, OVERRIDE AGENT, AND DNS NAME RESOLUTION METHOD

TECHNICAL FIELD

The present invention relates to a DNS (Domain Name System) name resolution system, an override agent, and a DNS name resolution method.

BACKGROUND ART

Non-patent Literature 1 describes a typical related art of DNS name resolution system.

The DNS name resolution system of Non-patent Literature 1 includes a user program, a resolver, and a name server.

The DNS name resolution system of Non-patent Literature 1 with a structure as described above operates as follows.

The user program communicates to the resolver as a user query DNS name information indicating the DNS name (e.g. domain name) that the client needs to resolve. The resolver generates a DNS query packet containing the DNS name information, and transmits the generated DNS query packet to the name server.

The name server actually performs the DNS name resolution process, generates a DNS response packet that contains the resolution information indicating the resolution result (e.g. the IP address corresponding to the domain name), and transmits the generated DNS response packet to the resolver. The user program receives the resolution information as a user response from the resolver.

Non-patent Literature 2 describes the concept of a typical DNS name resolution system and examples of character strings that can be used as DNS name information.

Non-patent Literature 3 gives a definition of an URL (Uniform Resource Locator).

Non-patent Literature 1: RFC1035 "DOMAIN NAMES—IMPLEMENTATION AND SPECIFICATION", November 1987, [search made on Feb. 19, 2009], Web URL: http://www.ietforg/rfc/rfc1035.txt.

Non-patent Literature 2: RFC1034 "DOMAIN NAMES—CONCEPTS AND FACILITIES", November 1987, [search made on Feb. 19, 2009], Web URL: http://www.ietf.org/rfc/rfc1034.txt.

Non-patent Literature 3: RFC1738 "Uniform Resource Locators (URL)", December 1994, [search made on Feb. 19, 2009], Web URL: http://www.ietf.org/rfc/rfc1738.txt.

A typical service provision method is in a form in which a server responsible for providing services has a finite number of fixed IP addresses (one, in many cases). The server provides a plurality of services through the finite number of fixed IP addresses.

In this method, after, through the DNS name resolution process, acquiring the IP address of the server responsible for providing services, the client is further required to designate the information to identify the service to which the client wants to connect to from within a plurality of the services provided by the server to reach the actual service. In other words, the client is unable to reach the actual service through the DNS name resolution process alone.

Another service provision method, which is rather special in kind, is in a form in which a server responsible for providing services has a large number of unfixed IP addresses. The server assigns a dedicated IP address to each service and provides a service through the IP address assigned thereto. In this method, after acquiring the information of IP address, the client can find the service to which it wants to connect to. In other words, the client is able to reach the actual service through the DNS name resolution process alone.

Therefore, anticipating the increasing popularity of the latter form of providing services, it would be necessary to build a DNS name resolution system that allows the client to reach the actual service through the DNS name resolution process alone.

The art described in Non-patent Literature 1 has several problems in building a DNS name resolution system as described above.

The first problem is that DNS name information that can be included in a DNS query packet is restricted to name information that is fixed in nature (e.g. the domain name of a server node). Besides name information, additional information that may change dynamically (e.g. information concerning a service) cannot be used as part of a query.

The reason for this is that the DNS name resolution system itself has inherently been designed and implemented for the purpose of providing name information that is fixed in nature (e.g. IP addresses) as resolution information.

The second problem is that, even if additional information that may change dynamically is used as DNS name information to be included in a DNS query packet, there is no function to analyze the DNS name information.

The reason for this is that the DNS server itself does not inherently have any function to analyze DNS name information containing additional information that is dynamic in nature.

The third problem is that it is restricted to Web applications among communication applications that can use additional information that may change dynamically, as DNS name information to be included in a DNS query packet, because Web applications can designate additional information in the form of URL by use of the Hyper Text Transfer Protocol (HTTP).

The reason for this is that every communication application is provided with a function to resolve DNS names but not a function to interpret URLs. Only Web applications have the latter function.

An object of the invention is to provide a DNS name resolution system, an override agent, and a DNS name resolution method, which enable every communication application on a client node to use additional information that may change dynamically, besides name information that is fixed in nature, as DNS name information to be included in a DNS query packet.

SUMMARY

According to a first exemplary aspect of the invention, a DNS name resolution system, includes a DNS server, a terminal which generates and transmits a DNS query packet containing DNS name information described in accordance with a specific description method and whose destination is the DNS server, and an override agent is disposed along a communication path between the terminal and the DNS server;

the override agent includes a capture unit which captures a DNS query packet transmitted from the terminal, an analysis unit which analyzes the DNS name information contained in the DNS query packet captured by the capture unit based on the information concerning the specific description method used by the terminal to describe the DNS name information, recognizes the information contained in the DNS name information, and selects the information for reply to the terminal based on the recognized information, and a reply unit which generates and transmits a DNS response packet containing the information for reply selected by the analysis unit and whose destination is the terminal.

According to a second exemplary aspect of the invention, an override agent is disposed along a communication path between the terminal and the DNS server; includes a capture unit which captures a DNS query packet transmitted from the terminal, an analysis unit which analyzes the DNS name information contained in the DNS query packet captured by the capture unit based on the specific description method used by the terminal to describe the DNS name information, recognizes the information contained in the DNS name information, and selects the information for reply to the terminal based on the recognized information, and a reply unit which generates and transmits a DNS response packet containing the information for reply selected by the analysis unit and whose destination is the terminal According to a third exemplary aspect of the invention, a DNS name resolution method, includes, at an override agent disposed along a communication path between a terminal and a DNS server, capturing a DNS query packet transmitted from a terminal which contains DNS name information described in accordance with a specific description method and whose destination is a DNS server; and analyzing the DNS name information contained in the captured DNS query packet based on the specific description method used by the terminal to describe the DNS name information, recognizing the information contained in the DNS name information, and selecting the information for reply to the terminal based on the recognized information, and generating and transmitting a DNS response packet which contains the selected information for reply and whose destination is the terminal.

The invention provides the effect that all the communication applications running on terminals can use, besides name information that is fixed in nature, additional information that may change dynamically as DNS name information, by describing DNS name information in accordance with a specific description method, because a function to analyze DNS name information is provided within the override agent.

EXEMPLARY EMBODIMENT

Exemplary embodiments of the present invention will be described below, with reference to the drawings.

(First Exemplary Embodiment)

The structure of the DNS name resolution system according to this exemplary embodiment will be described below, with reference to FIG. 1.

Figure 1:
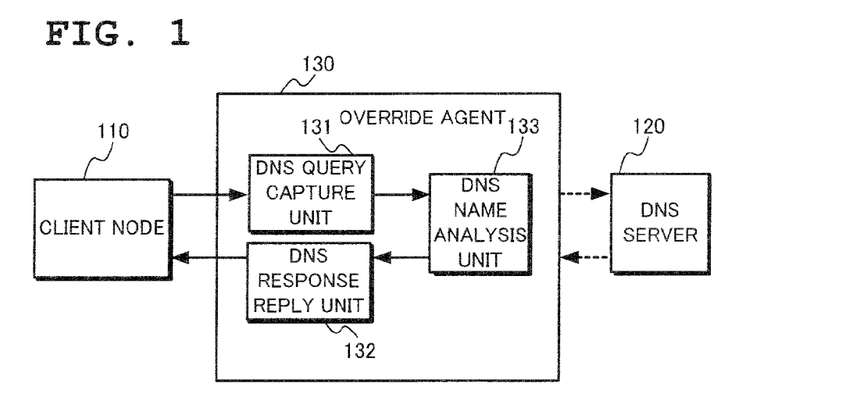
FIG. 1 is a diagram showing an example structure of a DNS name resolution system according to a first exemplary embodiment of the present invention.

As shown in FIG. 1, the DNS name resolution system of this exemplary embodiment has a client node 110, a DNS server 120, and an override agent 130.

A communication application is running on the client node 110. The communication application generates a DNS query packet containing DNS name information created by describing a DNS name in accordance with a specific description method, and transmits the generated DNS query packet.

The DNS server 120 is the destination of DNS query packets to be transmitted from the communication application running on the client node 110.

The override agent 130 is disposed along a communication path between the client node 110 and the DNS server 120 at a location from which DNS query packets can be captured.

Figure 2:
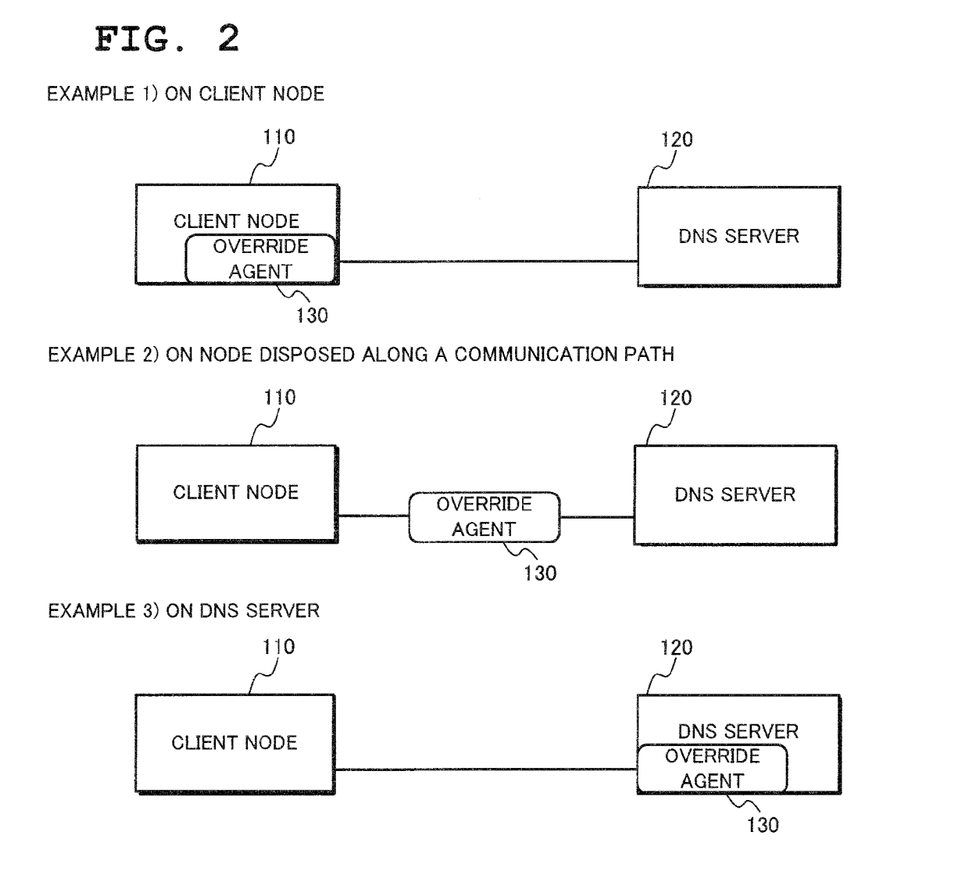
FIG. 2 is a diagram showing an example arrangement of the override agent, which is disposed along a communication path between a client node and a DNS server.

With reference to FIG. 2, there are roughly three types of possible arrangement for the override agent 130.

The first type of arrangement places the override agent 130 on the client node 110.

The second type of arrangement places the override agent 130 on a node disposed along a communication path between the client node 110 and the DNS server 120.

The third type of arrangement places the override agent 130 on the DNS server 120. Exceptionally, the first and third types may be considered as essentially the same type if the DNS server 120 runs on the client node 110.

For both the first and third types, the successful capture of DNS query packets can be ensured, because the override agent 130 operates on the node which serves as the transmission and reception ends for DNS query packets and through which all DNS query packets pass.

The "node disposed along a communication path" in the second type of arrangement is typically a router. The override agent 130 can capture DNS query packets if it is operated on the router. A node that is not a router can also be the "node disposed along a communication path," although such cases are less common. In a segment where the client node 110 and the DNS server 120 are located, the override agent 130 can be configured to operate in the segment by controlling an ARP (Address Resolution Protocol) table, a neighbor cache etc., which contains associations between IP (Internet Protocol) addresses and L2 (Layer 2) addresses.

Turning our eyes back to FIG. 1, the override agent 130 includes a DNS query capture unit 131, a DNS response reply unit 132, and a DNS name analysis unit 133.

The operations of these components will be outlined below.

The DNS query capture unit 131 captures a DNS query packet transmitted from the client node 110 and passes the packet to the DNS name analysis unit 133.

The DNS name analysis unit 133 extracts DNS name information from the DNS query packet passed from the DNS query capture unit 131.

It should be noted that the DNS name analysis unit 133 stores in advance information concerning the specific description method based on which the DNS name information was described by the client node 110. The description method, which will be detailed later, specifies the encoding method based on which additional information that may change dynamically should be encoded into the DNS name information.

Accordingly, DNS name analysis unit 133 can recognize the additional information encoded into DNS name information, as well as the fixed name information, by analyzing the DNS name information based on the description method described by the client node 110.

Based on the results of analyzing the DNS name information (i.e. recognized additional information and fixed name information), the DNS name analysis unit 133 then selects the information for reply to the client node 110 and passes it to the DNS response reply unit 132.

The DNS response reply unit 132 generates a DNS response packet based on the DNS query packet captured by the DNS query capture unit 131 and the information for reply passed from the DNS name analysis unit 133, and replies the generated DNS response packet to the client node 110.

With reference to the sequence diagram in FIG. 3, the overall operation of the DNS name resolution system according to this exemplary embodiment will be described below in detail. The description below assumes that the service designated by the client is being provided by the server node 140.

Figure 3:
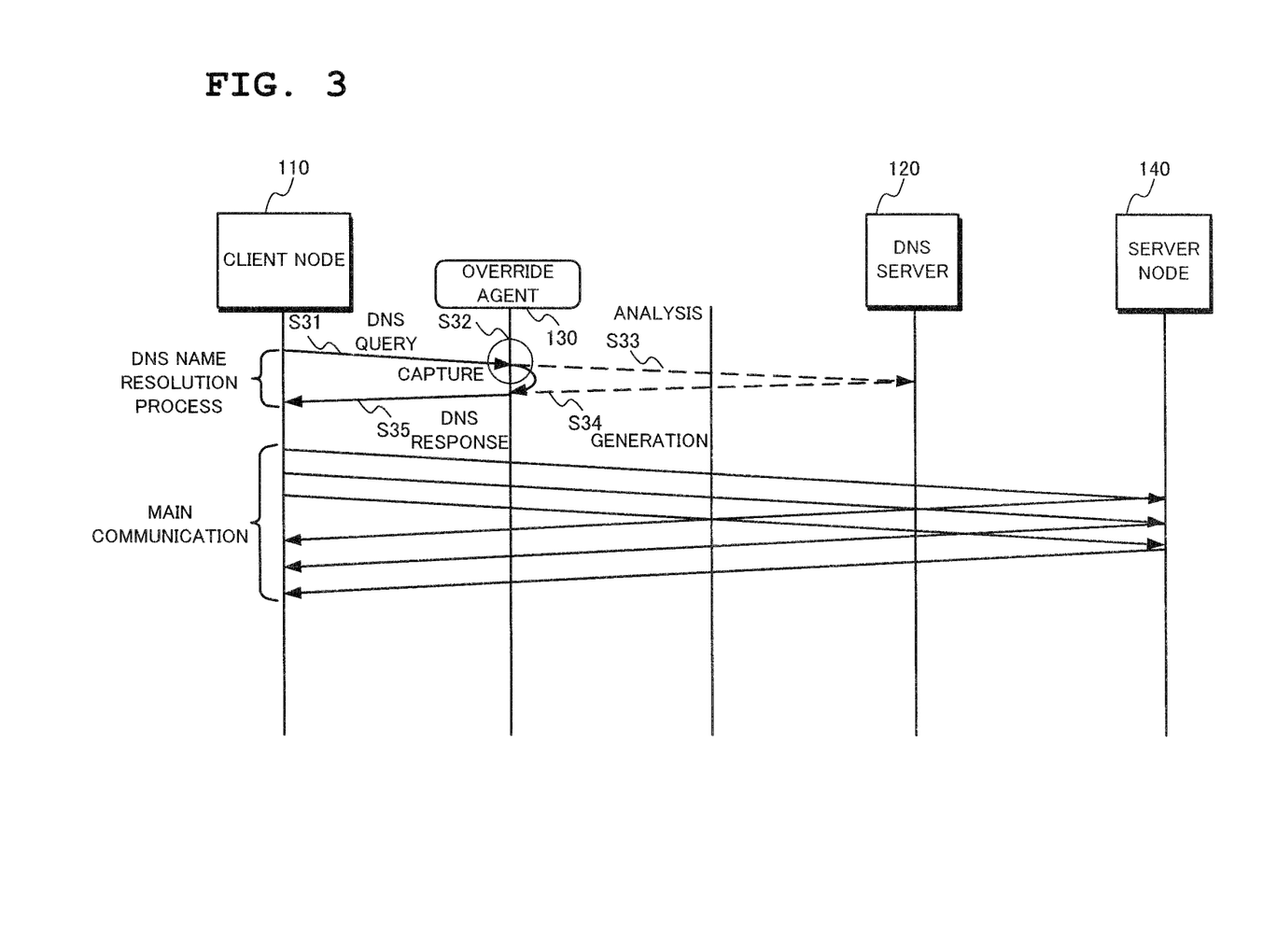
FIG. 3 is a sequence diagram illustrating an example operation of the DNS name resolution system according to the first exemplary embodiment of the present invention.

As shown in FIG. 3, in step S31, the communication application (e.g. telnet program) running on the client node 110 generates a DNS query packet containing DNS name information obtained by describing a DNS name in accordance with the specific description method, and transmits the generated DNS query packet.

The DNS name information includes additional information which may change dynamically, besides name information that is fixed in nature.

An example of name information is the domain name of the server node 140.

An example of additional information is attribute information which indicates the attributes of the service provided by the server node 140. If the server node 140 is providing a map provision service, then the attribute information may be the latitude, longitude and so on of the map data.

Just for brief information, the DNS name information appears like "xa--sel?key1=val1&key2=val2---server.example.com," while this information will be detailed later.

The destination of DNS query packets has been set on the client node 110 to the address of the DNS server 120. Path control and other necessary procedures are conducted to ensure successful delivery of packets to the DNS server 120.

In step S32, the DNS query capture unit 131 of the override agent 130, which is disposed along the communication path between the client node 110 and the DNS server 120, captures a DNS query packet transmitted from the client node 110.

Next, in step S33, the DNS name analysis unit 133 of the override agent 130 extracts the DNS name information from the DNS query packet captured by the DNS query capture unit 131, analyzes the extracted DNS name information based on the description method described by the client node 110, recognizes the name information and the additional information contained in the DNS name information, and selects the information for reply to the client node 110 based on the recognized additional information.

Examples of information to be returned include an IP address, e.g. an IPv4 or IPv6 address, that has been assigned on the server node 140 to the attribute of the service designated by the client node 110 as additional information in the DNS name information. Suppose for example that the server node 140 is providing a map provision service and that the client node 110 has designated in the additional information the latitude and longitude as the attribute of the service. In this case, the information to be returned is the IP address, e.g. an IPv4 or IPv6 address, that has been assigned by the server node 140 to the map data formed around the latitude and longitude designated by the client.

The process of selecting reply information based on the results of analysis will be described below.

If, for example, the DNS name analysis unit 133 fails to properly recognize additional information due to an error in the description designated as additional information, then the information indicating the situation or the error information itself will be selected as reply information and returned to the client node 110.

On the other hand, if the DNS name analysis unit 133 properly recognizes additional information by analyzing the description designated as additional information, the override agent 130 acquires information related to the attribute (e.g. latitude and longitude) designated as additional information (examples of such information including an IPv4 or IPv6 address assigned to map data) from, for example, an external knowledge base (such as a map base), and selects the acquired information as the information for reply.

It goes without saying that what kind of information, and how such information, should be selected based on analysis results are not restricted to the foregoing and may vary depending on the utilization form of this system.

Next, in step S34, the DNS response reply unit 132 of the override agent 130 generates a DNS response packet based on the information for reply selected by the DNS name analysis unit 133 and, in step S35, replies the generated DNS response packet to the client node 110.

The information for reply contained in the DNS response packet is ultimately passed to the communication application on the client node 110 as resolution information for the DNS name. The resolution information is used as destination information for the communication application to perform main communication with the server node 140.

Examples of description method for DNS name information will be described below, with reference to FIG. 4.

Figure 4:
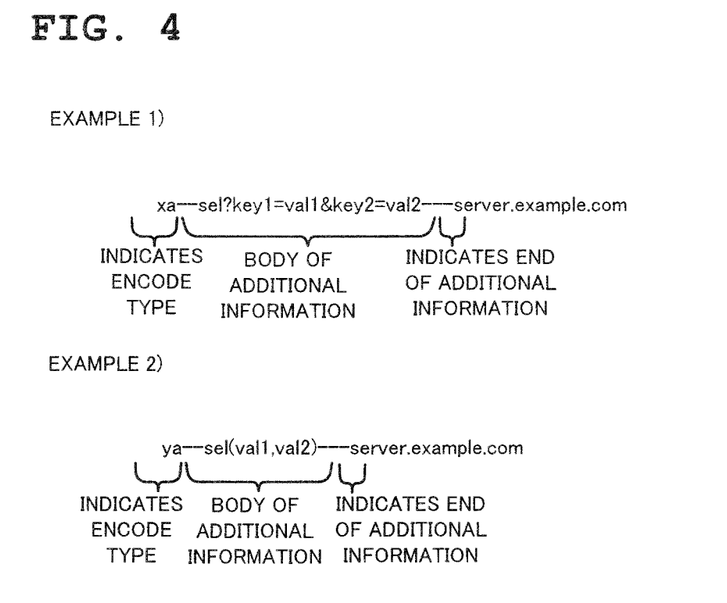
FIG. 4 is a diagram showing examples of description method for DNS name information.

FIG. 4 takes as an example a service called "sel," which is provided by a server node whose FQDN (Fully Qualified Domain Name) is "server.example.com." If the user wants to designate an attribute consisting of the item "key1" with a value of "val1" and the item "key2" with a value of "val2," then the user will need to use a DNS name as shown below:

"xa--sel?key1=val1&key2=val2---server.example.com"

The "xa--" part at the head indicates that this DNS name information contains additional information, such as detailed information for the service.

There are several possible methods that can be used to encode additional information into the DNS name information.

Therefore, the "xa--" part at the head also indicates the encode method (or encode type) that has been used, in addition to indicating that this is DNS name information containing additional information.

The "---" part indicates the end of the additional information created in accordance with the "xa--" encode method.

The encode method called "sel?key1=val1&key2=val2" is designed to resemble the expression form used for URLs and the like.

Other examples of encode method include one similar to the function call method used in the C language, wherein the number of items used when designating a service and the order of their appearance are determined in advance. In this encode method, the DNS name information as shown below must be used when the service in the example above is designated.

"ya--sel(val1, val2)---server.example.com"

The "ya--" part at the head indicates that the encode method that has been used.

There are certain characters that cannot generally been used for DNS names. The definitions of DNS name information are given in Non-patent Literature 2 and other documents. If an intended character is unusable in a DNS name, a function to escape it by replacing the character with a permitted character should be used (however, it is the responsibility of the communication application to check whether or not a character can be used in a DNS name; if the communication application does not perform a character check, such escape may be omitted).

Suppose that the service in the example above is designated. In this case, once the encode method is designated, DNS name information may be formed by using "--" as the escape leading character and then designating the escape method.

"xb--sel--2Fkey1--2Dval1--26key2-2Dval2---server.example.com"

"yb--sel--28val1--2Cval2-29---server.example.com"

It should be noted that an escape method may be considered as an encode method in a broad sense. An escape method, therefore, may be designated in the part at the head where usually an encode type is designated.

In addition, the concept of an escape method may be stretched to include simpler and more human understandable expression methods as variations of escape method. For example, when the service in the example above is designated, the DNS name information as shown below, in which an escape method is designated, may be used.

"xc--sel--key1.val1.key2.val2---server.example.com"

"yc--sel--val1.val2---server.example.com"

One possible example of FIG. 4 is as follows. A communication application running on the client node 110 is providing a map provision service called "sel." When providing the service, the communication application designates a value "val1" in the latitude item "key1" and a value "val2" in the longitude item "key2."

In this case, the communication application running on the client node 110 is able to acquire through the override agent 130 from the server node 140 the IP address assigned to map data formed around the latitude "val1" and the longitude "val2."

The effects of this embodiment will now be described.

In this exemplary embodiment, the override agent 130 disposed along the communication path between the client node 110 and the DNS server 120 comprises a function to capture a DNS query packet transmitted from the client node 110; a function to analyze the DNS name information contained in the DNS query packet and select the information for reply, based on the description method used by the client node 110 to describe the DNS name information; and a function to generate a DNS response packet containing the information for reply and reply the resultant packet to client node 110.

Since the override agent 130 is provided with a function to analyze DNS name information, an effect can be achieved that the communication application running on the client node 110 can use additional information which may change dynamically as DNS name information, besides name information which is fixed in nature, by describing DNS name information in accordance with the description method described above.

Therefore, even a communication application with simple functions only (e.g. telnet program) can make detailed designations for a service which it wants to be provided, as additional information besides fixed name information of, for example, the server node responsible for providing the service.

At this time, the client node 110 and the communication application running thereon understand that the DNS response packet has been replied from the destination of the DNS response packet, i.e. the DNS server 120.

The effect obtained by this is that the client node 110 and the communication application running thereon are not required to be modified or otherwise altered in any way in order to realize a function to use additional information as DNS name information.

(Second Exemplary Embodiment)

The structure of the DNS name resolution system according to this exemplary embodiment will be described below, with reference to FIG. 5.

Figure 5:
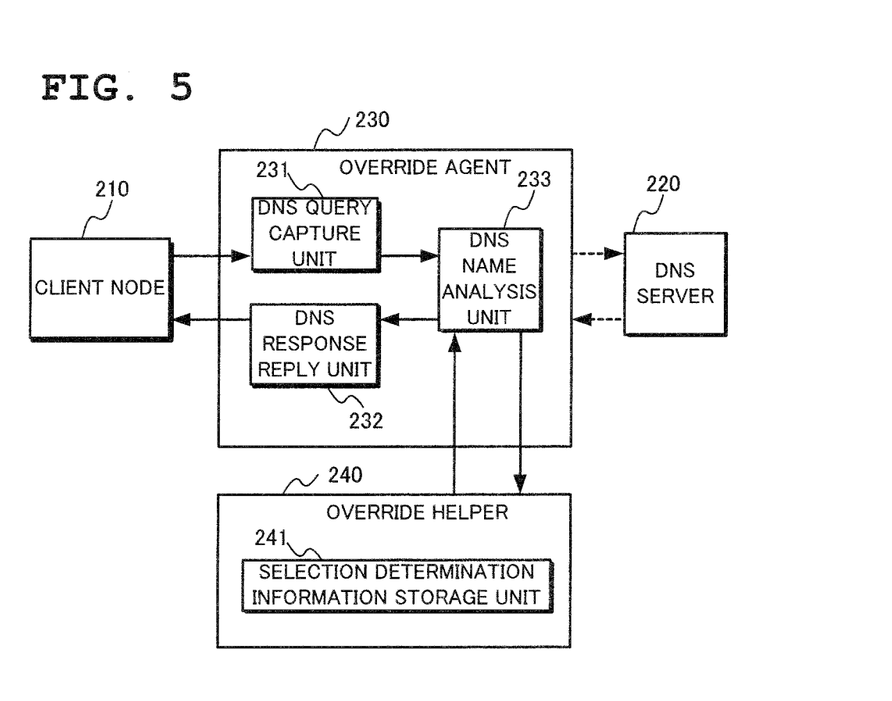
FIG. 5 is a diagram showing an example structure of a DNS name resolution system according to a second exemplary embodiment of the present invention.

As shown in FIG. 5, the DNS name resolution system of this exemplary embodiment has a client node 210, a DNS server 220, an override agent 240, and an override helper 240.

A communication application is running on the client node 210. The communication application generates a DNS query packet containing DNS name information created by describing a DNS name in accordance with a specific description method, and transmits the generated DNS query packet.

The DNS server 220 is the destination of DNS query packets to be transmitted from the communication application running on the client node 210.

The override agent 230 is disposed along a communication path between the client node 210 and the DNS server 220 at a location from which DNS query packets can be captured. Example dispositions of the override agent 230 are omitted herein, because dispositions of the override agent 230 are the same as those of the override agent 130 of the first exemplary embodiment (refer to FIG. 3).

The override helper 240 communicates with the override agent 230 and assists the function of the override agent 230.

The override agent 230 includes a DNS query capture unit 231, a DNS response reply unit 232, and a DNS name analysis unit 233.

The override helper 240 includes a selection determination information storage unit 241. The selection determination information storage unit 241 stores in advance the information to be replied in response to the additional information recognized by the DNS name analysis unit 233 of the override agent 230 through analysis of DNS name information. For example, in cases where additional information designates a latitude and a longitude, then the IP address, e.g. an IPv4 or IPv6 address, assigned to the map data formed around the latitude and the longitude is stored in the selection determination information storage unit 241.

The operations of these components will be outlined below.

The DNS query capture unit 231 captures a DNS query packet transmitted from the client node 210 and passes the packet to the DNS name analysis unit 233.

The DNS name analysis unit 233 extracts DNS name information from the DNS query packet passed from the DNS query capture unit 231.

It should be noted that the DNS name analysis unit 233 stores in advance information concerning the specific description method based on which the DNS name information was described by the client node 210. As is the case with the first exemplary embodiment, the description method specifies the encoding method based on which additional information that may change dynamically should be encoded into the DNS name information.

Accordingly, the DNS name analysis unit 233 can recognize the additional information encoded into DNS name information, as well as the fixed name information, by analyzing the DNS name information based on the description method described by the client node 110.

Based on the results of analyzing the DNS name information, the DNS name analysis unit 233 attempts to select the information for reply to the client node 210.

In case the DNS name analysis unit 233 has failed to select the information for reply by itself, it communicates with the override helper 240 and match the analysis results (the additional information recognized by analysis) against the information stored in the selection determination information storage unit 241. The DNS name analysis unit 233 selects the information for reply to the client node 210 from the selection determination information storage unit 241 and passes the information to the DNS response reply unit 232.

The DNS response reply unit 232 generates a DNS response packet based on the DNS query packet captured by the DNS query capture unit 231 and the information for reply passed from the DNS name analysis unit 233, and replies the generated DNS response packet to the client node 210.

Next, with reference to the sequence diagram in FIG. 6, the overall operation of the DNS name resolution system according to this exemplary embodiment will be described in detail. The description below assumes that the service designated by the client is being provided by the server node 250.

Figure 6:
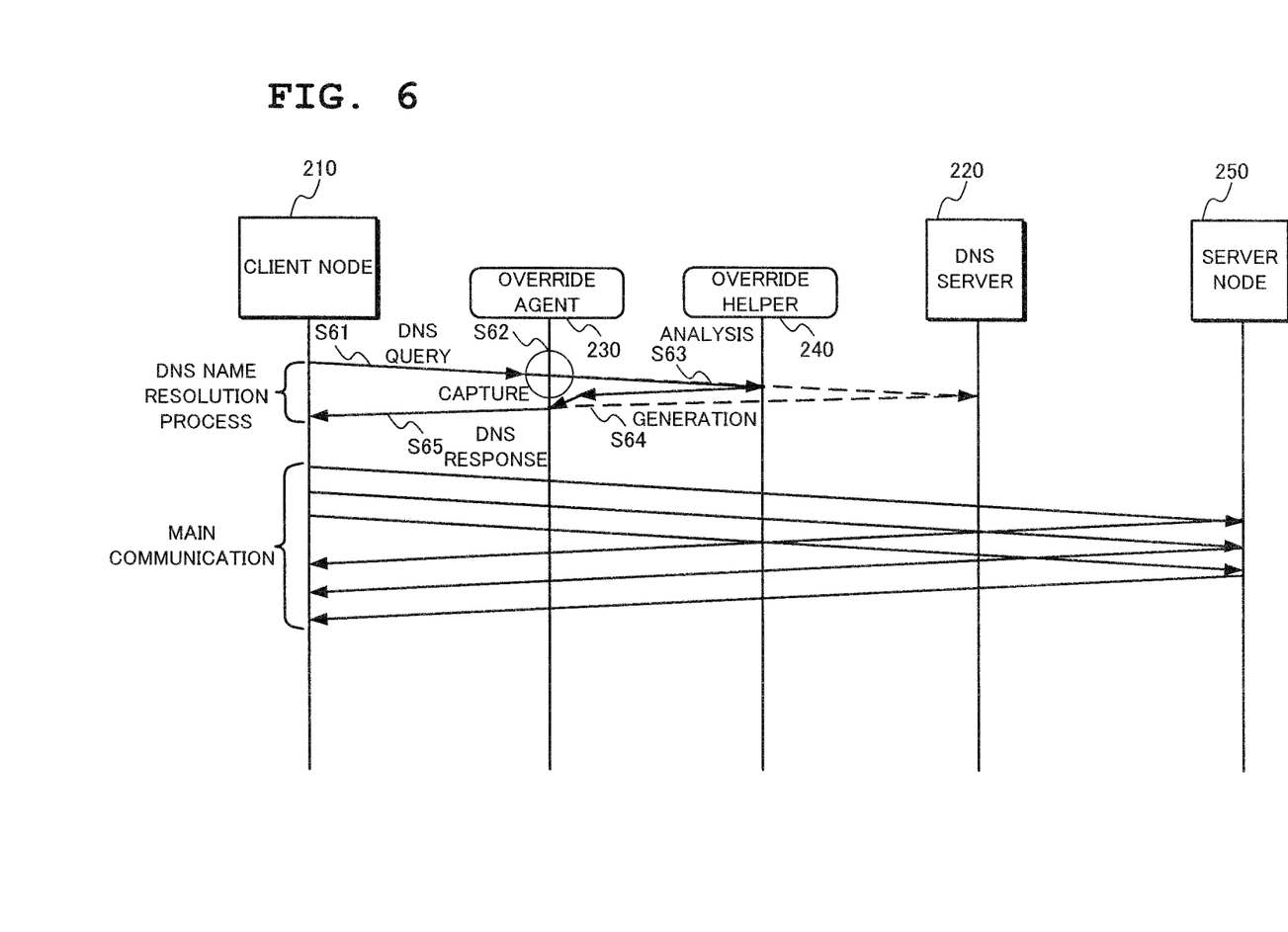
FIG. 6 is a sequence diagram illustrating an example operation of the DNS name resolution system according to the second exemplary embodiment of the present invention.

As shown in FIG. 6, in step S61, the communication application (e.g. telnet program) running on the client node 210 generates a DNS query packet containing DNS name information obtained by describing a DNS name in accordance with the specific description method, and transmits the generated DNS query packet.

The DNS name information includes additional information which may change dynamically, besides name information that is fixed in nature. The DNS name information appears like "xa--sel?key1=val1&key2=val2---server.example.com" (refer to FIG. 4) and is similar to the first exemplary embodiment, so the description thereof will be omitted herein.

The destination of DNS query packets has been set on the client node 210 to the address of the DNS server 220. Path control and other necessary procedures are conducted to ensure successful delivery of packets to the DNS server 220.

In step S62, the DNS query capture unit 231 of the override agent 230, which is disposed along the communication path between the client node 210 and the DNS server 220, captures a DNS query packet transmitted from the client node 210.

Next, in step S63, the DNS name analysis unit 233 of the override agent 230 extracts the DNS name information from the DNS query packet captured by the DNS query capture unit 231, analyzes the extracted DNS name information based on the description method described by the client node 210, and attempts to select the information for reply to the client node 210. In case the DNS name analysis unit 233 has failed to select the information for reply by itself, it communicates with the override helper 240 and selects the information for reply by matching the analysis results against the information stored in the selection determination information storage unit 241. The information for reply will not be described herein because it is the same as that in the first exemplary embodiment.

Next, in step S64, the DNS response reply unit 232 of the override agent 230 generates a DNS response packet based on the information for reply selected by the DNS name analysis unit 233 and, in step S65, replies the generated DNS response packet to the client node 210.

The information for reply contained in the DNS response packet is ultimately passed to the communication application on the client node 210 as resolution information for the DNS name. The resolution information is used as destination information for the communication application to perform main communication with the server node 140.

The effects of this embodiment will now be described.

In this exemplary embodiment, the override agent 230 disposed along the communication path between the client node 210 and the DNS server 220 comprises a function to capture a DNS query packet transmitted from the client node 210; a function to analyze the DNS name information contained in the DNS query packet and select the information for reply, based on the description method used by the client node 210 to describe the DNS name information; and a function to generate a DNS response packet containing the information for reply and reply the resultant packet to client node 210.

Since the override agent 230 is provided with a function to analyze DNS name information, an effect can be achieved that the communication application running on the client node 210 can use additional information which may change dynamically as DNS name information, besides name information which is fixed in nature, by describing DNS name information in accordance with the description method described above.

Therefore, even a communication application with simple functions only (e.g. telnet program) can make detailed designations for a service which it wants to be provided, as additional information besides fixed name information of, for example, the server node responsible for providing the service.

At this time, the client node 210 and the communication application running thereon understand that the DNS response packet has been replied from the destination of the DNS response packet, i.e. the DNS server 220.

The effect obtained by this is that the client node 210 and the communication application running thereon are not required to be modified or otherwise altered in any way in order to realize a function to use additional information as DNS name information.

Furthermore, in this exemplary embodiment, the override agent 230 is provided with a function to communicate with the override helper 240 and select the information for reply by matching the analysis results against the information stored in the override helper 240.

Therefore, an effect can be achieved that even DNS name information containing the designation of a service that is too complicated to be resolved by the override agent 230 alone can be dealt with by utilizing the assistance of the external override helper 240.

The functions of the override agent 130, 230 in FIGS. 1 and 5 may be realized entirely by software, or at least part thereof by hardware. For example, the processes of the DNS query capture unit 131, 231, the DNS response reply unit 132, 232, and the DNS name analysis unit 133, 233 may be realized by one or more programs running on a computer, or at least part thereof by hardware.

Simply put, the invention can be realized as software by executing the programs that provide the functions of the DNS query capture unit 131, 231, the DNS response reply unit 132, 232, and the DNS name analysis unit 133, 233 on computer equipment incorporating the override agent 130, 230.

INCORPORATION BY REFERENCE

This application is based upon and claims the benefit of priority from Japanese patent application No. 2009-076139, filed on Mar. 26, 2009, the disclosure of which is incorporated herein in its entirety by reference.

INDUSTRIAL APPLICABILITY

The invention can be applied to any communication application that performs DNS name resolution for the purpose of enabling the detailed designation of a service to connect to without modifying the application itself.

What is claimed is:

1. A DNS name resolution system, comprising:
   a DNS server;
   a terminal which generates and transmits a DNS query packet containing DNS name information described in accordance with one of a plurality of specific description methods and whose destination is said DNS server, the DNS name information including the one of the plurality of specific description methods describing the DNS name information; and
   an override agent which captures the DNS query packet transmitted from said terminal, analyzes the DNS name information contained in the captured DNS query packet based on said one of the plurality of specific description methods used by said terminal to describe the DNS name information, and replies to said terminal a DNS response packet containing the information for reply selected based on the analysis results, said override agent is disposed along a communication path between said terminal and said DNS server, said override agent includes:
   a capture unit which captures the DNS query packet transmitted from said terminal,
   an analysis unit which analyzes the DNS name information contained in the captured DNS query packet captured by said capture unit based on the information concerning said one of the plurality of specific description methods used by said terminal to describe the DNS name information, recognizes the information contained in said DNS name information, and selects the information for reply to said terminal based on the recognized information, and
   a reply unit which generates and transmits a DNS response packet containing the information for reply selected by said analysis unit and whose destination is said terminal.

2. The DNS name resolution system of claim 1, further comprising an override helper connected to said override agent and wherein
   said analysis unit selects said information for reply by matching said analysis results against the information stored in said override helper.

3. A computer configured to execute a program, the computer which when executing the program is configured to act as an override agent, said override agent is disposed along a communication path between said terminal and said DNS server, the override agent performing a method comprising:
   capturing a DNS query packet transmitted from a terminal which contains DNS name information described in accordance with one of a plurality of specific description methods and whose destination is a DNS server, the DNS name information including the one of the plurality of specific description methods describing the DNS name information;
   analyzing the DNS name information contained in the captured DNS query packet based on the information concerning said one of the plurality of specific description methods used by said terminal to describe the DNS name information, the analyzing using one of the plurality of specific description methods used by said terminal to describe the DNS name information;
   recognizing the information contained in said DNS name information;
   selecting the information for reply to said terminal based on the recognized information; and
   generating and transmitting a DNS response packet, containing the information for reply selected and whose destination is said terminal.

4. The computer of claim 3, wherein the selecting is based on said information for reply by matching said analysis results against the information stored in an external override helper.

5. The computer of claim 3, wherein said DNS name information includes fixed information which is a fixed value, and additional information which may be a dynamic value; and
   said one of the plurality of specific description methods specifies the encode method used to encode said additional information into said DNS name information.

6. A DNS name resolution method, comprising:
   at an override agent disposed along a communication path between a terminal and a DNS server,
   capturing a DNS query packet transmitted from a terminal which contains DNS name information described in accordance with one of a plurality of specific description methods and whose destination is a DNS server, the DNS name information including the one of the plurality of specific description methods describing the DNS name information;
   analyzing the DNS name information contained in the captured DNS query packet based on the information concerning said one of the plurality of specific description methods used by said terminal to describe the DNS name information, the analyzing using one of the plurality of specific description methods used by said terminal to describe the DNS name information;
   recognizing the information contained in said DNS name information;
   selecting the information for reply to said terminal based on the recognized information; and
   generating and transmitting a DNS response packet which contains said selected information for reply and whose destination is said terminal.

7. The DNS name resolution method of claim 6, wherein said analysis step selects said information for reply by matching said analysis results against the information stored in an external override helper.

8. The DNS name resolution method of claim 6, wherein said DNS information includes fixed information which is a fixed value, and additional information which may be a dynamic value; and
   said one of the plurality of specific description methods specifies the encode method used to encode said additional information into said DNS name information.

9. A computer readable medium storing a program, wherein said program causing a computer which incorporates an override agent disposed along a communication path between a terminal and a DNS server to execute the processes of:
   capturing a DNS query packet transmitted from a terminal, which contains DNS name information described in accordance with one of a plurality of specific description methods and whose destination is a DNS server, the DNS name information including the one of the plurality of specific description methods describing the DNS name information;

analyzing the DNS name information contained in the captured DNS query packet based on the information concerning said one of the plurality of specific description methods used by said terminal to describe the DNS name information, the analyzing using one of the plurality of specific description methods used by said terminal to describe the DNS name information;

recognizing the information contained in said DNS name information;

selecting the information for reply to said terminal based on the recognized information; and generating and transmitting a DNS response packet which contains the selected information for reply and whose destination is said terminal.

10. The DNS name resolution system of claim 1, wherein the DNS name information further includes additional information indicating information to be returned which is corresponding to an attribute of a service.

11. The DNS name resolution system of claim 10, wherein said DNS name information includes fixed information which is a fixed value, and said additional information which may be a dynamic value; and said one of the plurality of specific description methods specifies the encode method used to encode said additional information into said DNS name information.

* * * * *